Patented June 6, 1950

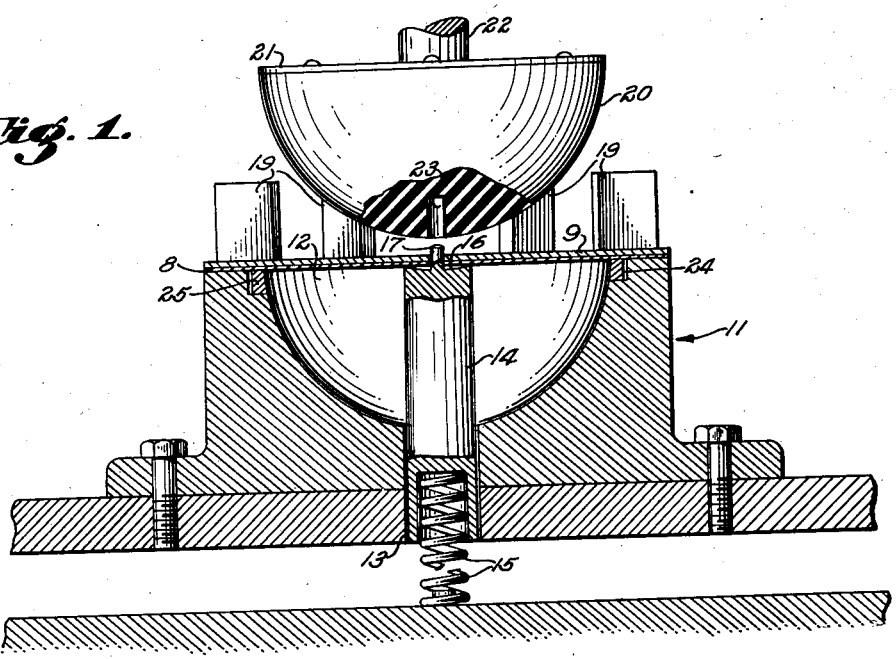
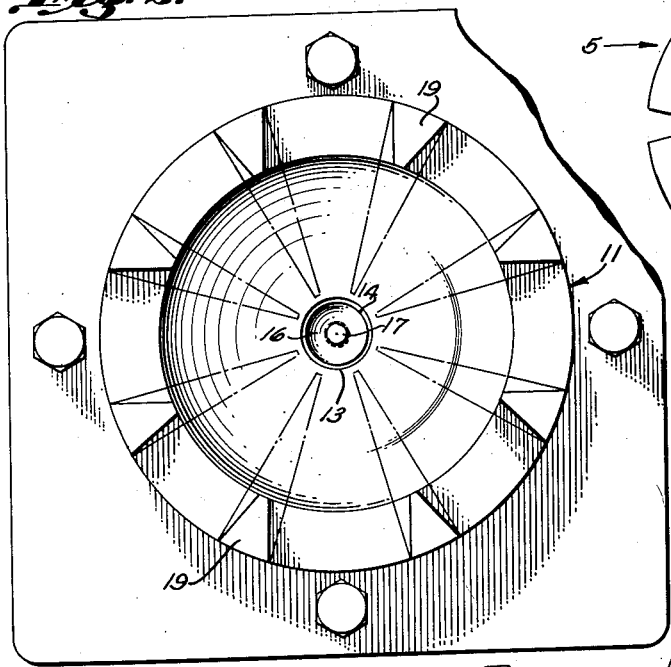
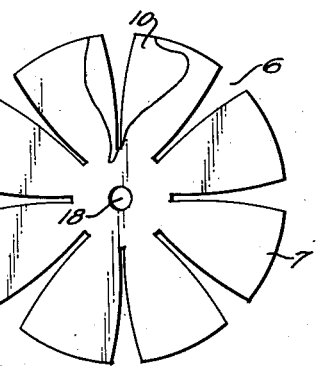

2,510,214

UNITED STATES PATENT OFFICE 2,510,214

METHOD OF AND APPARATUS FOR FORMING BLANKS

John W. Ekstedt, Union, Albert F. Pityo, Clifton, and Harry Butterfield, Maplewood, N. J.

Application February 17, 1947, Serial No. 729,024

9 Claims. (Cl. 18—19)

Our invention relates to a method of and apparatus for forming blanks into substantially hemispherical globe sections.

An important object of the invention is to provide means to properly guide the blank into the substantially hemispherical mold cavity, whereby the blank is properly centered in the mold cavity while being formed.

A further object of the invention is to provide means for preforming a globe section and partly curing same and holding the free edge of the formed globe section to prevent possibility of separation.

Other objects and advantages of the invention will be apparent during the course of the following description.

In the accompanying drawings forming a part of this application and in which like numerals are employed to designate like parts throughout the same, Figure 1 is a central vertical longitudinal section through apparatus embodying our invention, Figure 2 is a plan view of the same, and, Figure 3 is a plan view of a blank.

In Figure 3 we have shown a circular blank, which is employed in forming each hemispherical globe section, and this blank is designated by the numeral 5. The blank has radial inwardly tapering openings 6 cut therein, forming radial blank sections 7. Each blank 5 is formed of paper, including an outer smooth or hard or dense layer 8 and an inner highly porous absorbent layer 9, these two layers being securely united or formed integral. The outer layer 8 has parts of a map or design printed or otherwise formed thereon, as indicated at 10. The layers 8 and 9 are impregnated with a thermo-setting plastics compound such as a phenolic plastics. The plastics compound is allowed to dry before the forming steps.

The numeral 11 designates a mold, having a hemispherical mold cavity 12, having its open end arranged uppermost and horizontal. The mold 11 is held stationary by any suitable means. The mold is rigid and may be formed of metal, such as iron. The mold 11 is provided in its bottom with a vertical opening 13 for receiving a reciprocatory vertical plunger 14, urged upwardly by a spring 15. At its top, the plunger has a spherically curved recess 16, having the same radius as the mold cavity 12. A pin 17 is rigidly secured to the upper end of the plunger at the center of the recess 16. This pin is adapted to enter an opening 18 in the center of the blank 5. Surrounding the mold cavity 12 is an annular group of stationary guide lugs 19, which are spaced to be arranged between the radial sections 7 and guide the same. These guide lugs 19 are vertically elongated and are horizontally tapered inwardly and the side faces of the adjacent pair of lugs are parallel.

The numeral 20 is a main plunger, which is spherically curved and preferably formed of suitably stiff rubber. The plunger is carried by a metal head 21, secured to a rod 22. The plunger 20 has a vertical opening 23 to receive the pin 17.

The mold 11 is provided at its top with an annular groove or recess 24 for receiving a ring 25, removably held within the annular recess.

In preforming the blank 5, such blank is arranged horizontally upon the top of the mold 11 and above the ring 25, and the radial sections 7 engage the guide lugs 19 while the pin 17 enters the opening 18. The lugs 19 extend between the radial sections 7 within the radial openings 6 and slidably engage the longitudinal edges of the radial sections 7. These lugs guide the radial sections 7 while the outer marginal edge of the circular blank is slidably supported and free to move inwardly, since no clamping action is applied to such marginal outer portion. The blank 5 includes the layers 8 and 9 which are impregnated with the thermo-setting plastics material, which is now dry and uncured. The plunger 20 is moved downwardly and forces the blank 5 into the mold cavity 12, whereby the blank is formed into the hemispherical globe section and the ring 25 applied to the globe section at its equator edge. There is a slight clearance between the ring 25 and the mold 11, so that the ring will remain upon the formed globe section when the globe section is removed from the mold cavity. The longitudinal edges of the radial sections 7 abut. The pin 17 holds the circular blank 5 so that its marginal edge is concentric with the upper open end of the mold cavity 12 when the blank 5 is in the upper horizontal position, and this concentric relation is maintained when the blank is formed and forced downwardly into the mold cavity. It is thus seen that the blank is accurately guided during its downward movement, and this causes the radial sections 7 to properly interfit and have their longitudinal edges abut. The blank is now subjected to pressure within the mold cavity 12, with or without heat to form the same, as stated, and to partly cure the thermo-setting plastics material, the pressure and heat being discontinued short of the complete curing stage. However, the preformed hemispherical globe section is stiff and will retain its shape during handling. The ring 25 serves to prevent the open end of the globe section from spreading while it is being handled, and this ring is removed as the globe section is introduced into the mold cavity. A preformed hemispherical globe section is thus produced which is partly cured. Two of these preformed globe sections are introduced into a spherical mold cavity and subjected to pressure therein, with or without heat, for forming the completed globe.

The present application is a division of our copending application for Method of making hollow spheres, filed December 1, 1944, Serial No. 566,154.

It is to be understood that the forms of our invention herewith shown and described are to be taken as preferred examples of the same, and that various changes in the shape, size, and arrangement of parts of the apparatus may be resorted to, and that changes may be made in the order of the steps of the method, without departing from the spirit of the invention or the scope of the subjoined claims.

Having thus described our invention, what we claim is:

1. The method of forming a hemisphere, comprising arranging generally horizontal and adjacent to the open end of a substantially hemispherical mold cavity of a rigid mold, a circular paper blank having thermosetting plastics material applied thereto and having radial sections provided with geographical designations and radial openings between the sections, slidably engaging the longitudinal edges of the radial sections of the circular paper blank when the paper blank is horizontally arranged for holding such blank against turning movement and permitting the longitudinal movement of the radial sections, engaging the center of the blank and thereby centering the same, then exerting a clamping action upon the central portion of the blank and moving the central portion of the blank into the mold cavity by such clamping action, slidably supporting the outer marginal edge portion of the blank which is free from clamping action, and pressing the formed paper blank within the mold cavity against the wall of the mold cavity, and at least partly curing the thermosetting plastics material while the hemisphere is in the mold cavity.

2. The method of forming a hemisphere, comprising arranging an originally substantially flat circular paper blank over the open end of a substantially hemispherical mold cavity of a rigid mold and a ring separable from the mold, the circular paper blank being impregnated with thermosetting plastics material and having radial sections, exerting a clamping action upon the central portion of the blank and moving the central portion of the blank through the ring and into the mold cavity by such clamping action, slidably supporting the outer marginal portion of the blank which is free from clamping action, completing the forming of the blank into the hemisphere within the mold cavity and thereby applying the ring to the formed hemisphere adjacent to its open end, at least partly curing the thermosetting plastics material while the hemisphere is in the mold cavity, and removing the formed hemisphere from within the mold cavity and retaining the ring upon the removed hemisphere.

3. The method of forming a hemisphere, comprising removably mounting a ring within the open end of a substantially hemispherical mold cavity of a rigid mold, the bore of the ring having the same diameter as the mold cavity; arranging an originally substantially flat circular paper blank treated with a thermosetting plastics material over the open end of the mold cavity and ring, centering the blank with respect to the mold cavity and ring, moving the blank into the ring and mold cavity and pressing the blank against the inner wall of the ring and the face of the hemispherical mold cavity for thereby forming the blank into a hemisphere and applying the ring to the hemisphere adjacent to its open end, at least partly curing the thermosetting plastics material while the hemisphere is in the mold cavity, and removing the formed hemisphere from within the mold cavity while retaining the ring upon the hemisphere.

4. Apparatus for forming a hemisphere, comprising a mold having a substantially hemispherical mold cavity, the open end of the mold cavity being arranged uppermost, a substantially vertical plunger movable within the mold cavity in substantial alignment with the center of the open end of the mold cavity, a centering pin carried by the plunger and extending above the same and of smaller diameter than the plunger, a spring to raise the plunger, the top of the plunger being near the elevation of the top of the mold when the plunger is in the raised position, the top of the mold and the top of the raised plunger serving to support a normally substantially flat paper blank, the blank having a central opening to receive the centering pin and radial sections and openings between the sections, a group of spaced guide lugs mounted upon the top of the mold and horizontally tapered inwardly so that the opposed faces of adjacent pairs of lugs are substantially parallel, the lugs being arranged within the openings between the blank sections to engage the longitudinal edges of such sections and prevent the blank from turning upon its centering pin, and a substantially spherically curved plunger for movement into the mold cavity and having an opening to receive the centering pin, that portion of the plunger adjacent to the opening serving to clamp the blank against the upper end of the plunger.

5. Apparatus for forming a hemisphere, comprising a mold having a substantially hemispherical mold cavity, the open end of the mold cavity being arranged uppermost, a substantially vertical plunger movable within the mold cavity in substantial alignment with the center of the open end of the mold cavity, a centering pin mounted upon the upper end of the plunger and projecting above the same and concentric therewith and having a smaller diameter than the plunger, the top end of the plunger surrounding the centering pin being spherically curved, a spring to raise the plunger, the top of the mold and the top of the plunger when raised serving to support a normally substantially flat blank having a central opening and radial sections and radial openings between the sections, the central opening receiving the centering pin, a group of spaced guide lugs mounted upon the top of the mold and arranged within the radial openings between the radial sections and engaging the longitudinal edges of the radial sections to prevent the blank from turning upon the centering pin, and a substantially spherically curved plunger for movement into the mold cavity and adapted to clamp the central portion of the blank against the spherically curved top of the plunger.

6. Apparatus for use in connection with the substantially circular blank having radial sections and radial openings between the sections, said apparatus comprising a mold having a substantially hemispherical mold cavity and a blank supporting face adjacent to the open end of the mold cavity, circumferentially spaced guide lugs adjacent to the blank supporting face and projecting into the openings between the radial sections, and a substantially spherically curved plunger to engage the blank and move it into the mold cavity and press the blank against the wall of the mold cavity to produce a hemisphere.

7. Apparatus for use in connection with a substantially circular blank having radial sections and radial openings between the sections, said apparatus comprising a mold having a blank supporting horizontal stationary face and a substantially hemispherical mold cavity having its open end adjacent to said face, circumferentially spaced vertical guide lugs disposed above and near the stationary guide face and projecting into the openings between the radial sections, a substantially spherically curved plunger to engage the blank and move it into the cavity and press the same against the wall of the cavity, and resilient means within the mold cavity to contact with the blank and oppose the movement of the plunger so that the plunger has clamping engagement with the blank.

8. Apparatus for use in connection with a substantially circular blank having radial sections and radial openings between the sections and a central opening, said apparatus comprising a mold having a horizontal stationary blank supporting face and a substantially hemispherical mold cavity having its open end adjacent to the face, a lug vertically disposed adjacent to the guide face and projecting into the opening between the radial sections, a vertical guide pin arranged within the mold cavity to enter the central opening in the blank, the lug and guide pin controlling the turning movement of the blank, and a spherically curved plunger to engage the blank and move it into the mold cavity.

9. Apparatus for use in connection with a substantially circular blank having radial sections and radial openings between the sections, said apparatus comprising a mold having a substantially hemispherical mold cavity, substantially vertical circumferentially spaced guide lugs arranged adjacent to the open end of the mold cavity to enter the openings between the radial sections, a removable ring disposed adjacent to the open end of the mold cavity and having its inner wall substantially flush with the face of the mold cavity, and a substantially spherically curved plunger to force the blank through the ring and into the mold cavity and press the blank against the faces of the ring and mold cavity.

JOHN W. EKSTEDT.
ALBERT F. PITYO.
HARRY BUTTERFIELD.

REFERENCES CITED

The following references are of record in the file of this patent:

UNITED STATES PATENTS

| Number | Name | Date |
|---|---|---|
| 643,235 | Rogers et al. | Feb. 13, 1900 |
| 843,854 | Waterman | Feb. 12, 1907 |
| 1,385,431 | De Olaneta | July 26, 1921 |
| 2,208,583 | Hoof | July 23, 1940 |
| 2,282,423 | Kapitke | May 12, 1942 |
| 2,305,998 | Simmons | Dec. 22, 1942 |
| 2,328,992 | Nielsen | Sept. 7, 1943 |
| 2,369,583 | Lucid | Feb. 13, 1945 |